(12) United States Patent
Wilson

(10) Patent No.: US 10,513,229 B2
(45) Date of Patent: Dec. 24, 2019

(54) TRUCK BED ON-BOARD STORAGE SYSTEM

(71) Applicant: Jeff A. Wilson, Lakewood, CO (US)

(72) Inventor: Jeff A. Wilson, Lakewood, CO (US)

(*) Notice: Subject to any disclaimer, the term of this patent is extended or adjusted under 35 U.S.C. 154(b) by 0 days.

(21) Appl. No.: 15/794,370

(22) Filed: Oct. 26, 2017

(65) Prior Publication Data

US 2018/0086277 A1  Mar. 29, 2018

Related U.S. Application Data

(63) Continuation-in-part of application No. 15/281,928, filed on Sep. 30, 2016, now Pat. No. 9,802,548, which is a continuation-in-part of application No. 15/009,686, filed on Jan. 28, 2016, now Pat. No. 9,650,085, which is a continuation-in-part of application No. 14/340,220, filed on Jul. 24, 2014, now abandoned.

(60) Provisional application No. 61/865,742, filed on Aug. 14, 2013.

(51) Int. Cl.
| | |
|---|---|
| *B60R 9/10* | (2006.01) |
| *B60R 9/06* | (2006.01) |
| *B60P 3/04* | (2006.01) |
| *B60R 11/06* | (2006.01) |
| *B60J 7/14* | (2006.01) |
| *B60R 5/04* | (2006.01) |
| *B60P 1/00* | (2006.01) |

(52) U.S. Cl.
CPC .............. *B60R 9/065* (2013.01); *B60J 7/141* (2013.01); *B60P 3/04* (2013.01); *B60R 5/045* (2013.01); *B60R 9/10* (2013.01); *B60R 11/06* (2013.01); *B60P 1/003* (2013.01)

(58) Field of Classification Search
CPC ...... B60R 9/00; A01K 1/0272; A01K 1/0245; B60P 3/04; B60J 7/1621
USPC ............... 224/404; 296/37.6, 37.5, 100.09
See application file for complete search history.

(56) References Cited

U.S. PATENT DOCUMENTS

| | | | |
|---|---|---|---|
| 2,897,781 A | * | 8/1959 | Olson ............... A01K 1/0272 119/496 |
| 3,353,704 A | | 11/1967 | Belcher |
| 4,091,950 A | | 5/1978 | Craven |
| 4,635,992 A | | 1/1987 | Hamilton |
| 4,850,519 A | | 7/1989 | Farmer, Jr. |

(Continued)

FOREIGN PATENT DOCUMENTS

| | | |
|---|---|---|
| WO | 1989/012546 A1 | 12/1989 |
| WO | 1989/012564 A1 | 12/1989 |

*Primary Examiner* — Corey N Skurdal
(74) *Attorney, Agent, or Firm* — Trenner Law Firm, LLC; Mark D. Trenner

(57) ABSTRACT

An example truck bed on-board storage system includes a first panel configured to slide into at least one slot formed in a truck bed. Hinge(s) are mounted to a bedrail of the truck bed. A second panel is connected to the hinge(s). The first and second panels form a first enclosure with at least three walls and a floor of the truck bed. A rear wall of the truck bed is spaced apart from the cab of the truck bed at a distance to receive both the first and second panels. The first and second panels are configured to be removed from the truck bed and slid between the rear wall of the truck bed and the cab of the truck. A third panel and a fourth panel forms a second enclosure with the first panel and at least two walls and the floor of the truck bed.

10 Claims, 17 Drawing Sheets

(56) References Cited

U.S. PATENT DOCUMENTS

| | | | |
|---|---|---|---|
| 5,065,699 A * | 11/1991 | Marshall | A01K 1/0245 119/453 |
| 5,147,103 A * | 9/1992 | Ducote | A01K 1/0272 119/453 |
| 5,169,200 A | 12/1992 | Pugh | |
| 5,186,510 A | 2/1993 | Stapp | |
| 5,201,561 A | 4/1993 | Brown | |
| 5,398,868 A | 3/1995 | Densen | |
| 5,464,264 A | 11/1995 | Wilson | |
| 5,598,961 A | 2/1997 | Sills | |
| 6,135,527 A * | 10/2000 | Bily | B60R 7/02 296/24.4 |
| 6,257,640 B1 * | 7/2001 | Leitner | B60R 9/00 224/404 |
| 6,499,434 B1 * | 12/2002 | Tyler | A01K 1/0272 119/453 |
| 6,536,826 B1 * | 3/2003 | Reed | B60P 3/42 224/404 |
| 6,641,013 B2 * | 11/2003 | Dise | B60R 9/00 220/23.2 |
| 7,028,859 B2 | 4/2006 | Moon et al. | |
| D520,190 S * | 5/2006 | Joyner | D30/108 |
| 8,070,210 B2 * | 12/2011 | Lotz | A01K 1/0272 119/453 |
| 8,317,442 B2 * | 11/2012 | Daikuzono | B60P 7/14 410/121 |
| 9,247,711 B2 * | 2/2016 | Reginhard | A01K 1/0272 |
| 9,650,085 B2 | 5/2017 | Wilson | |
| 2005/0229866 A1 * | 10/2005 | Simpson | A01K 1/0245 119/499 |
| 2006/0266778 A1 | 11/2006 | Allotey | |
| 2012/0085600 A1 | 4/2012 | Maimin | |
| 2015/0048129 A1 | 2/2015 | Wilson | |
| 2016/0167718 A1 | 6/2016 | Wilson | |
| 2017/0015254 A1 | 1/2017 | Wilson | |

* cited by examiner

US 10,513,229 B2

TRUCK BED ON-BOARD STORAGE SYSTEM

PRIORITY CLAIM

This application is a continuation-in-part (CIP) application of U.S. patent application Ser. No. 15/281,928 filed Sep. 30, 2016 for "Truck Bed Storage System" of Jeff A. Wilson, which is a continuation-in-part (CIP) application of U.S. patent application Ser. No. 15/009,686 filed Jan. 28, 2016 for "Modular Truck Bed Storage System" of Jeff A. Wilson, which is a continuation-in-part (CIP) application of U.S. patent application Ser. No. 14/340,220 filed Jul. 24, 2014 for "Modular Truck Bed Storage System" of Jeff A. Wilson and claims the priority benefit of U.S. Provisional Patent Application No. 61/865,742 filed Aug. 14, 2013 for "Truck Storage" of Jeff A. Wilson, each hereby incorporated by reference in its entirety as though fully set forth herein.

BACKGROUND

Pickup trucks continue to be a popular choice of consumers for a variety of uses (e.g., personal/recreational and commercial transportation). One reason for their popularity is the truck bed which enables transport of cargo and other articles outside of the passenger cabin. Unfortunately, anything stowed in the truck bed generally remains visible and is susceptible to weather and theft.

DETAILED DESCRIPTION

Figure 1A:
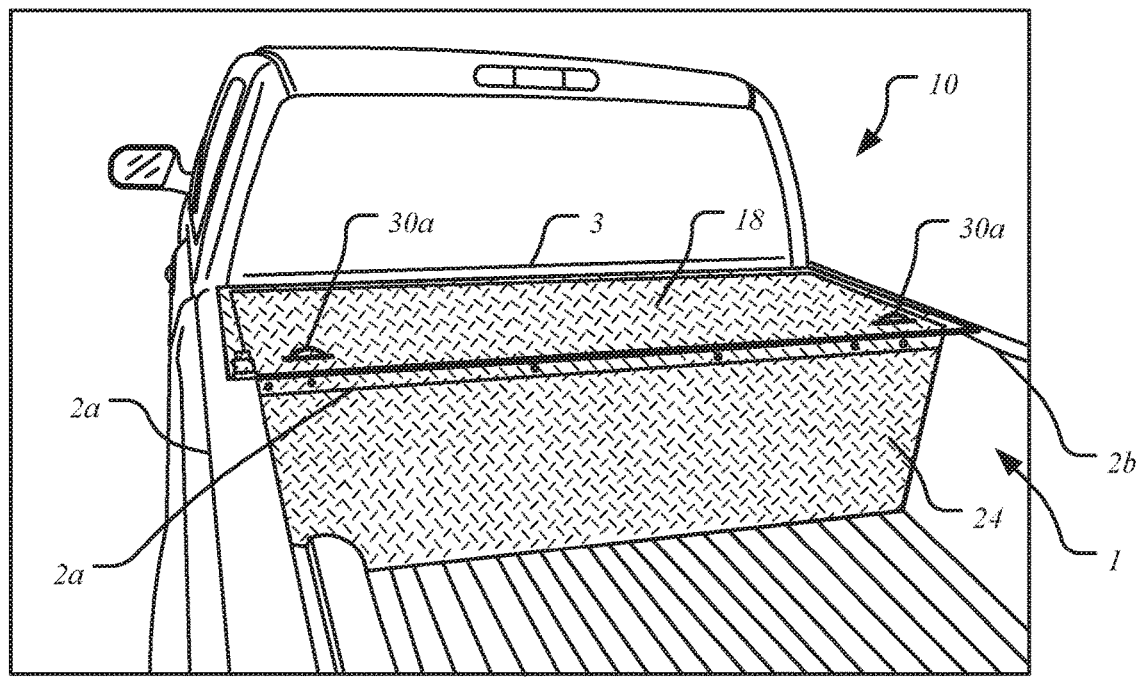
FIGS. 1A and 1B show an example truck bed storage system as it may be installed in a truck bed.

About 10 years ago, the standard pickup bed length was 8 feet long. Today it is between about 6 and 6.5 feet long. The "standard" tool box width is about 2 feet. Therefore, the standard tool box uses approximately 30% of the total bed length. With the 6 foot bed, a 30% loss of the bed length becomes a problem. A "standard" cargo box uses approximately 60% of the bed length, creating an even bigger problem. Pickup trucks are designed for open bed hauling, and tool boxes and cargo boxes tend to restrict that use. For example, truck owners often have to remove their tool box 3 or 4 times every month to accommodate open bed hauling.

The truck bed storage system disclosed herein enables a cargo box and/or tool box configuration with a quick conversion to open bed hauling. In addition, the conversion can be made even when away from home, because the box remains fastened to the truck and allows for 100% open bed hauling.

A truck bed storage system is disclosed which may be readily assembled and unassembled in a bed of a truck or "truck bed." An example of the truck bed storage system includes an end panel, and a lid assembly forming a compartment in the truck bed. The example truck bed storage system is configured for securement to at least one sidewall of a truck bed. In an example, surfaces of the truck bed itself (e.g., sidewalls and floor) are used to form part of the storage compartment. The truck bed storage system can be readily uninstalled from the truck bed, and easily stored (e.g., in a small storage closet).

Conventional tonneau covers often require one to one and a half hours of installation time. Even after the tonneau cover has been installed the first time (e.g., the holes are drilled into the truck bed), reinstalling the tonneau cover is a laborious project. Often, the cover is not uninstalled, because it takes so long and may even need two people to remove/install. Even simple tool boxes can require one-half hour or more initial installation time.

In contrast, the two-sided box and cover disclosed herein are a simple and quick to install without needing tools. An example of the truck bed storage system includes a frame having an opening formed therethrough; at least one lock mechanism to connect the frame to a sidewall of a truck bed; a bedrail stop connected to the frame, the bedrail stop configured to fit over a front portion of the truck bed and stop the frame from sliding away from the front portion of the truck bed; a first panel hinged to the frame, the first panel forming a lid of a storage area formed in the truck bed; and a second panel hinged to the frame, the second panel forming a back side of the storage area formed in the truck bed.

In another example, a truck bed on-board storage system includes a first panel configured to slide into at least one slot formed in a truck bed of a truck. At least one hinge is mounted to a bedrail of the truck bed. A second panel connected to the at least one hinge. The first and second panels forming a first enclosure with at least three walls and a floor of the truck bed. A rear wall of the truck bed is spaced apart from the cab of the truck bed at a distance to receive both the first and second panels. The first and second panels are configured to be removed from the truck bed and slid between the rear wall of the truck bed and the cab of the truck. A third panel and a fourth panel form a second enclosure with the first panel and at least two walls and the floor of the truck bed.

In an example, the truck bed on-board storage system includes a first pet enclosure on the first enclosure. A second pet enclosure (and/or extension to the first pet enclosure) may be provided on the second enclosure. The extension to the pet enclosure is movable off of the second enclosure and onto the pet enclosure in a stacked configuration. The fourth panel can be raised to provide access to the second enclosure when the extension to the pet enclosure is moved off of the second enclosure.

Before continuing, it is noted that as used herein, the terms "includes" and "including" mean, but is not limited to, "includes" or "including" and "includes at least" or "including at least." The term "based on" means "based on" and "based at least in part on."

It should be further noted that the truck bed storage system should not be limited to dimensions which may be represented in the figures. Various sizes and dimensions may be used to accommodate a variety of vehicles (e.g., large and smaller truck beds) and/or various configurations of the truck bed storage system itself. Nor should the truck bed storage system be limited to any particular material of manufacture. In addition, components shown and described in the example(s) may be interchanged and/or added to and/or removed from components of another of the example(s).

Figure 1B:
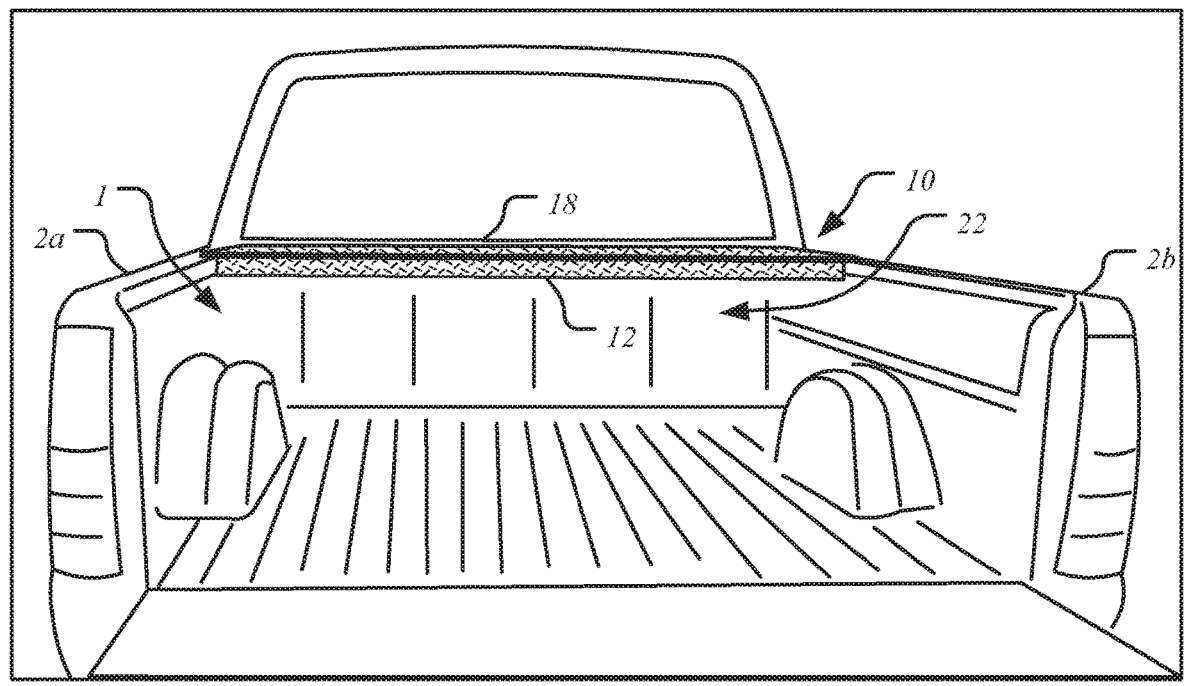
Figure 2:
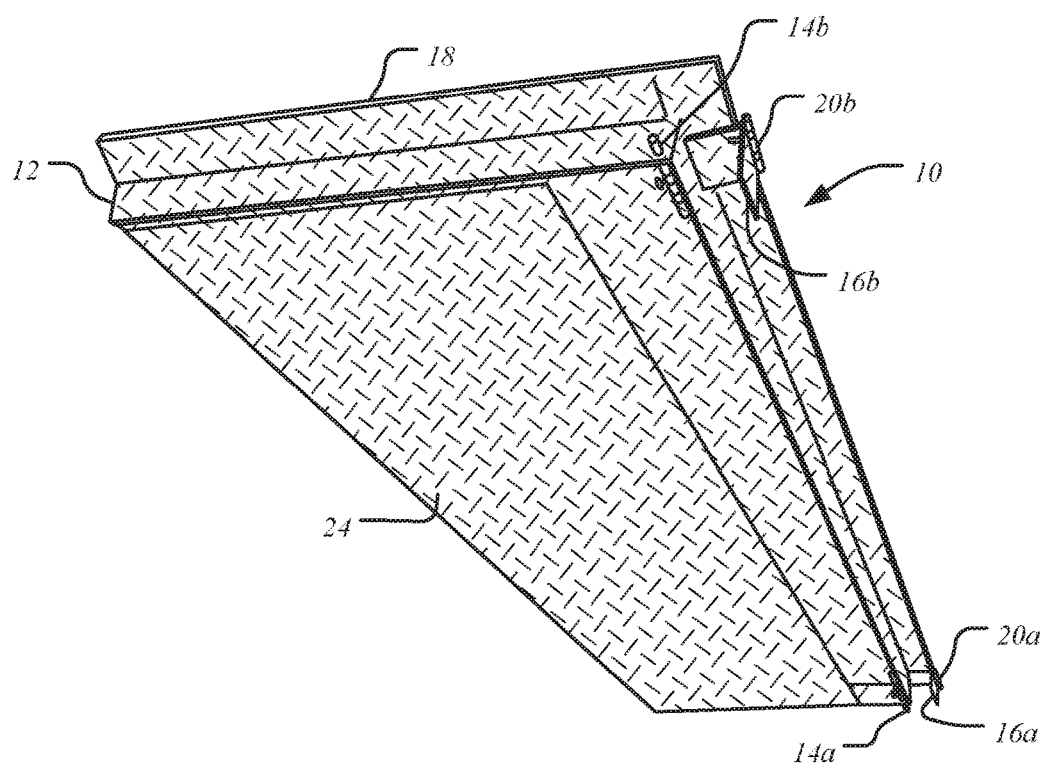
FIG. 2 shows the example truck bed storage system shown in FIG. 1 removed from a truck bed.
Figure 3:
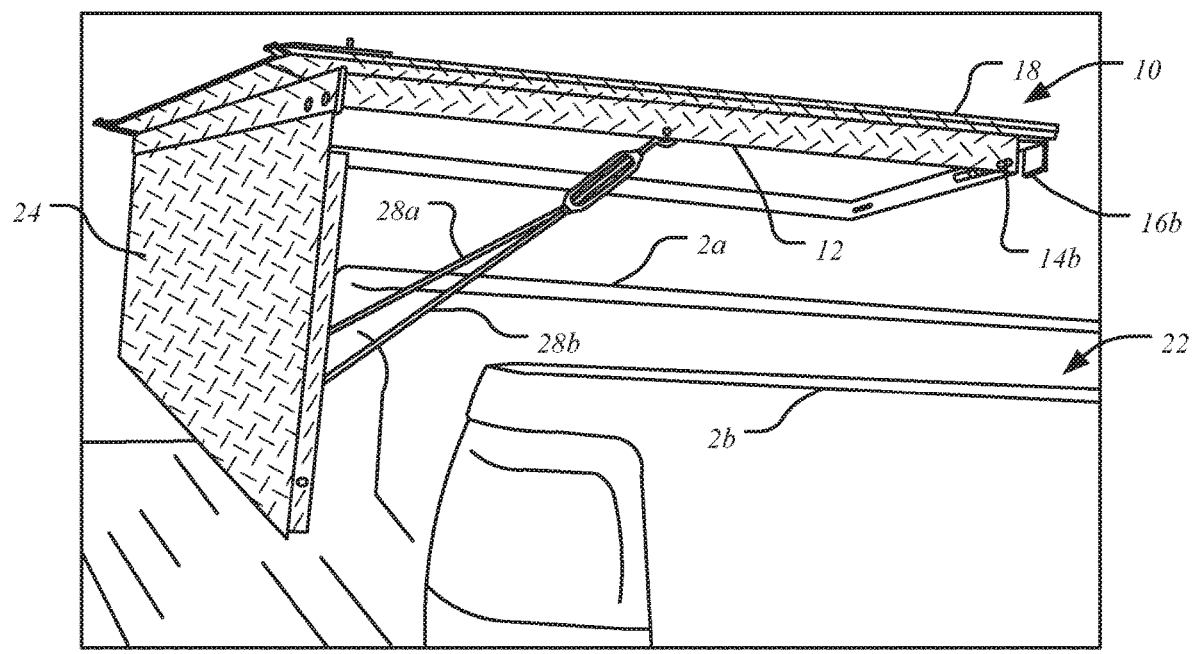
FIG. 3 illustrates installation of the example truck bed storage system in a truck bed.
Figure 4:
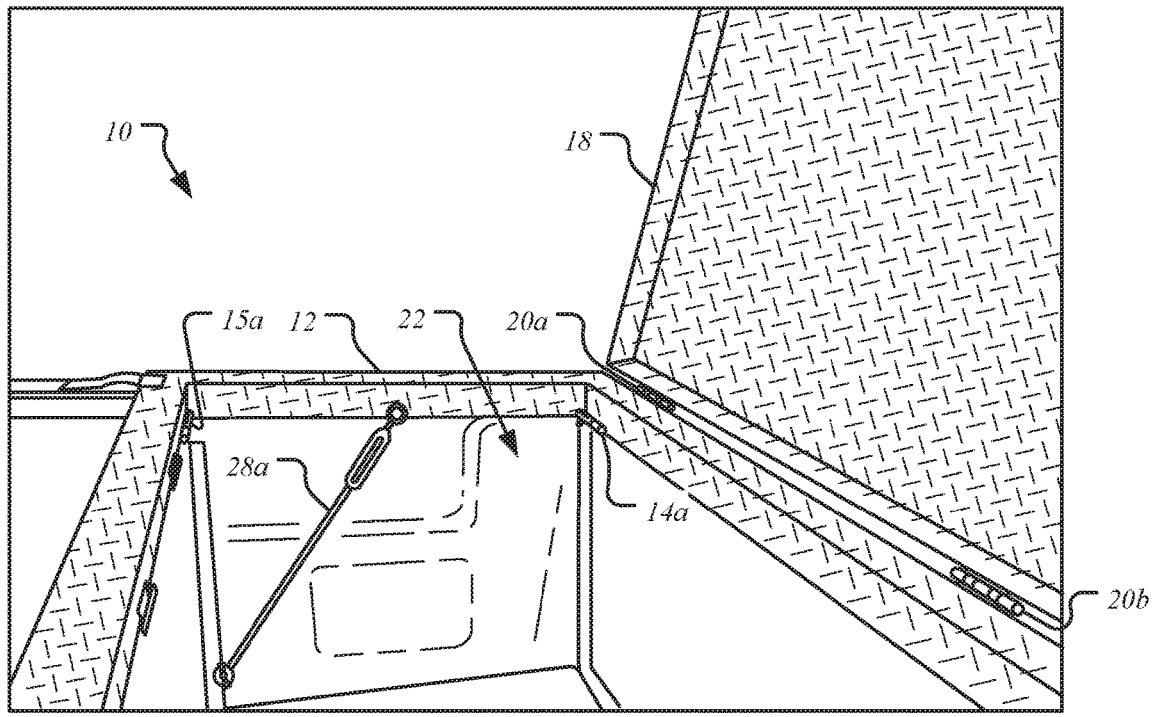
FIG. 4 is a close-up view showing a lock mechanism of the example truck bed storage system.
Figure 5:
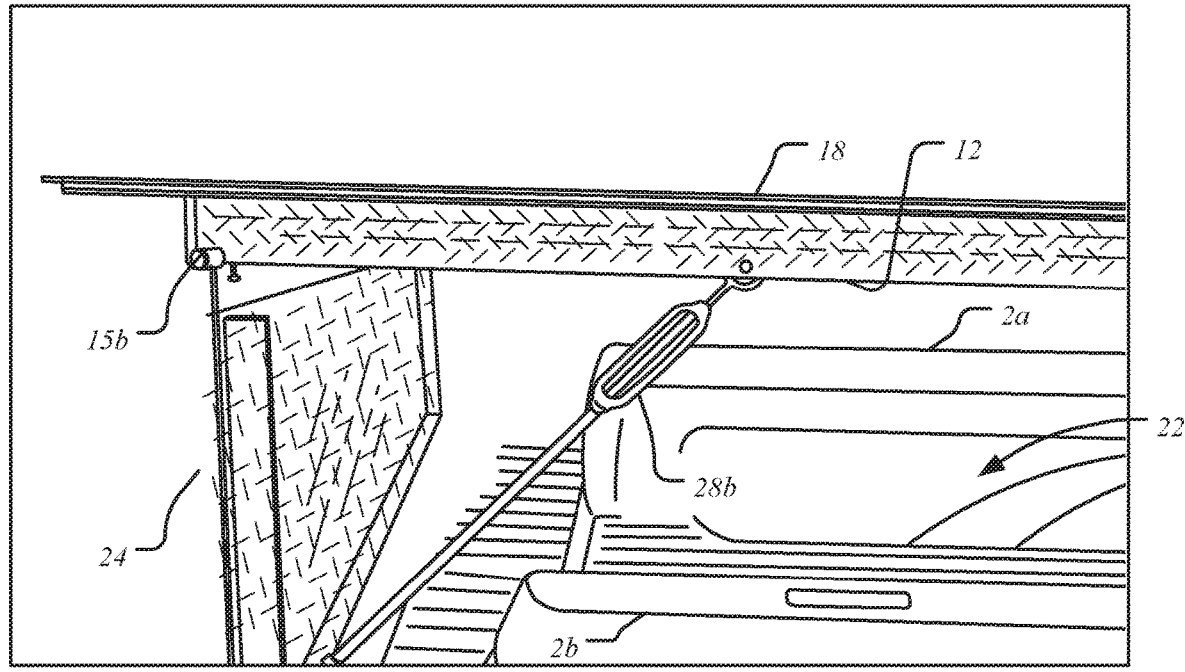
FIG. 5 is a close-up view showing an end-plate fastener of the example truck bed storage system.
Figure 6:
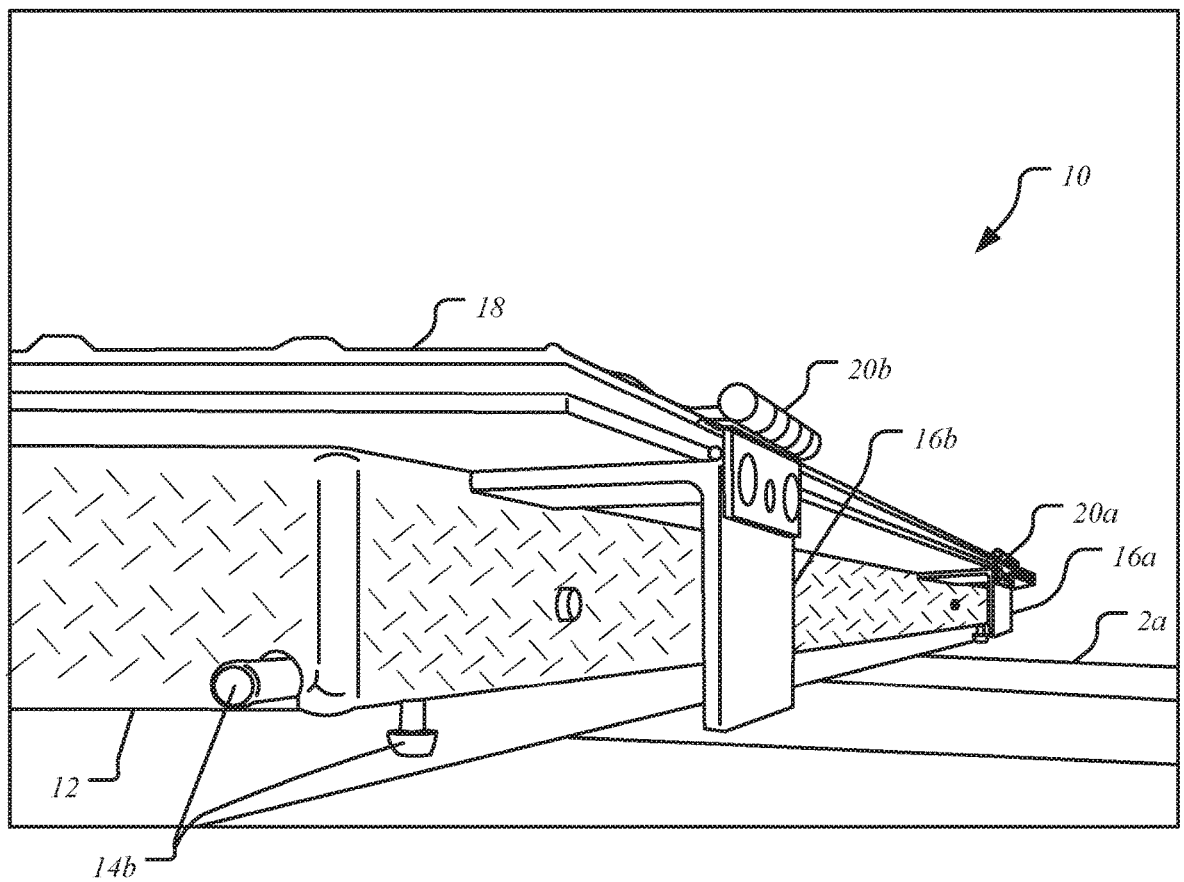
FIG. 6 is a close-up view showing a bedrail stop of the example truck bed storage system.

FIGS. 1A and 1B show an example truck bed storage system 10 as it may be installed in a truck bed 1. FIG. 2 shows the example truck bed storage system 10 shown in FIG. 1 removed from the truck bed 1. FIG. 3 illustrates installation of the example truck bed storage system 10 in truck bed 1. FIG. 4 is a close-up view showing a lock mechanism of the example truck bed storage system 10. FIG. 5 is a close-up view showing an end-plate fastener of the example truck bed storage system 10. FIG. 6 is a close-up view showing a bedrail stop of the example truck bed storage system 10.

The example truck bed storage system 10 includes a frame 12 having an opening 13 (see FIG. 4) formed therethrough. At least one lock mechanism (e.g., lock sliders 14a-b and 15a-b visible in FIG. 2 and FIGS. 4-5) connects the frame 12 to one or more of the sidewalls 2a and 2b of the truck bed 1. A bedrail stop (e.g., brackets 16a and 16b or "angle irons") may be connected to the frame 12. The bedrail stop is configured to fit over a front portion 3 of the truck bed 1 and stops the frame 12 from sliding away from the front portion 3 of the truck bed 1. A first panel 18 is hinged to the frame 12 (e.g., by hinges 20a and 20b shown in FIG. 2). The first panel 18 forms a lid of a storage area 22 (see, e.g., FIG. 1B and FIG. 4) formed in the truck bed 1. A second panel 24 is hinged to the frame 12 (e.g., by hinges 26a and 26b shown in FIGS. 7A and 7B). The second panel 24 forms a back side of the storage area 22 formed in the truck bed 1.

The storage system may be provided in any of a variety of sizes according to the size of the storage space desired and the size of the pick-up truck bed into which the system will be assembled. Any of a variety of articles may be held within an assembled truck-bed storage system, for example, tools and camping equipment.

In an example, the first panel or lid 18 rotates on the hinges 16a and 16b to lift away from the frame 12 to open the storage area 22 formed in the truck bed 1. The second panel or back side 24 can be folded under the frame 12, e.g., by rotating on hinges 26a and 26b. Folding the back side 24 opens or provides rearward access to the storage area 22 formed in the truck bed 1, as illustrated in FIG. 1B. Folding the back side 24 also enables ready transport and storage of the truck bed storage system 10, e.g. as illustrated by FIG. 2.

In an example, the lock mechanism (e.g., slide locks 14a-b and 15a-b) stops the frame from lifting up from the sidewalls 2a-2b of the truck bed 1 without modifying the sidewalls of (e.g., drilling through or attaching to) the truck bed. For example, the slide locks 14a-b and 15a-b may be configured to slide under the inside sidewall 2a and 2b of the truck bed 1, and substantially or completely stop the frame 12 from lifting up from the sidewall 2a and 2b of the truck bed 1.

In an example, the truck bed storage system 10 includes end-plate fasteners 28a and 28b, as shown in FIG. 3. The end-plate fasteners 28a and 28b may be connected on a first end to a lower portion of the end-plate 24, and the end-plate fasteners 28a and 28b may be connected on a second end to the frame 12. The end-plate fasteners 28a and 28b may be configured to secure the end-plate 24 (e.g., as shown in FIG. 1A) and keep the end-plate 24 from inadvertently opening and spilling contents stored in the storage area 22. The end-plate fasteners 28a and 28b may be removed on at least one end to enable opening of the end-plate 24 (e.g., as shown in FIG. 1B).

In an example, handles 30a and 30b may be provided (e.g., as shown in FIG. 1A on the lid 18). Handles 30a and 30b may facilitate the user lifting and lowering the lid 18. The handles 30a and 30b may also facilitate the user to install and remove the truck bed storage system 10 into and out of the truck bed 1. Other accessories may also be provided (e.g., locks and hooks).

During installation, the truck bed storage system 10 can be placed into the truck bed 1. No drilling is needed. The frame 12 may be secured to the side walls of the truck bed 10 with slider locks or other lock mechanism. To remove the truck bed storage system 10, the process for installation can be reversed. Installation and removal of the truck bed storage system 10 may easily be performed by a single person. When removed from the truck bed 1, the truck bed storage system 10 occupies a small space (e.g., relative to the space defined by installed truck bed storage system 10). This feature facilitates storage and transport of the system.

Before continuing, it should be noted that the examples described above are provided for purposes of illustration, and are not intended to be limiting. Other devices and/or device configurations may be utilized to carry out the operations described herein.

Figure 7A:
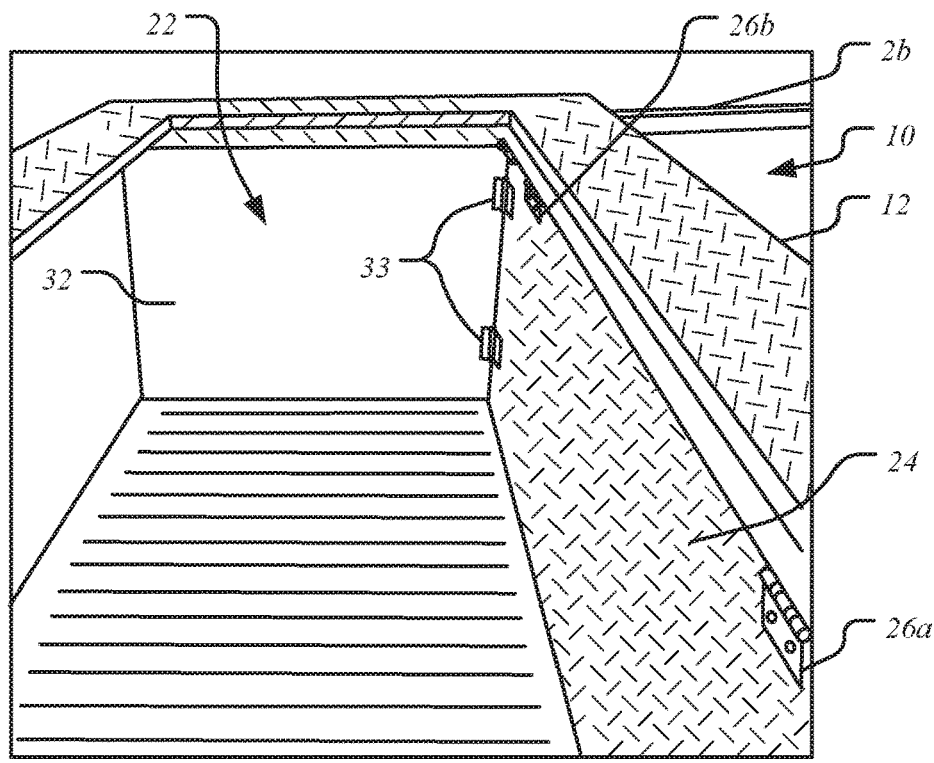
FIGS. 7A and 7B are close-up views showing a side wing of the example truck bed storage system.
Figure 7B:
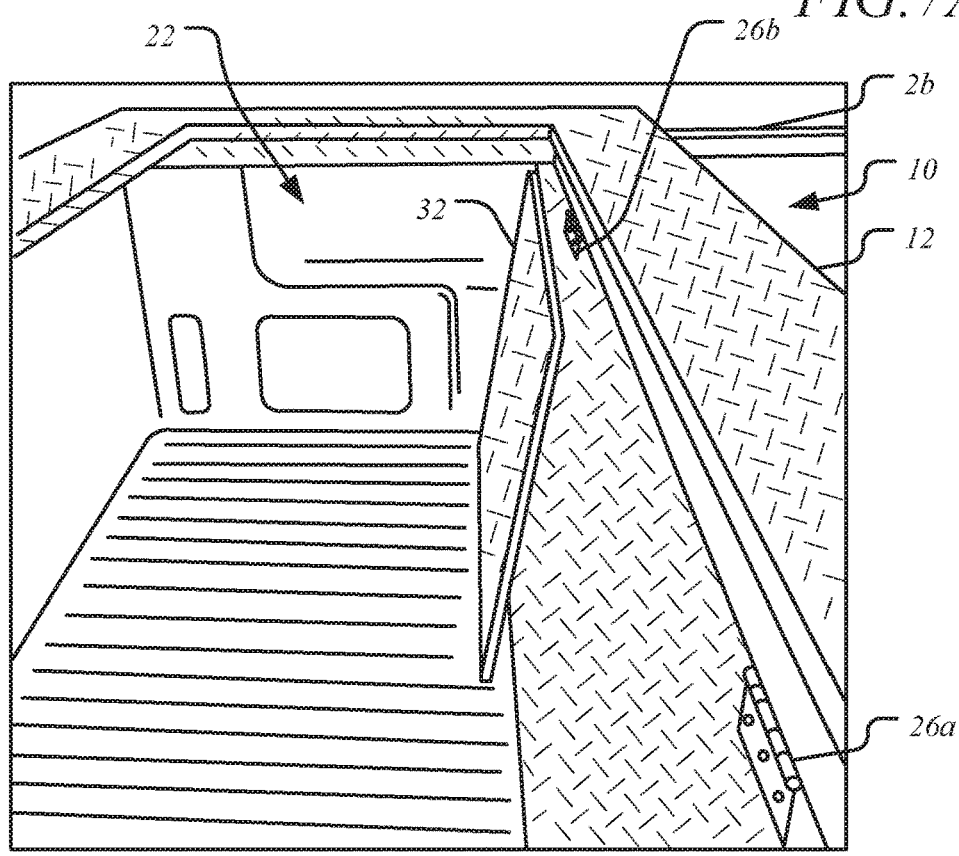

FIGS. 7A and 7B are close-up views showing a side wing 32 of the example truck bed storage system 10. In an example, the truck bed storage system 10 includes a third panel on one side, and a fourth panel on the other side. The third panel is a first wing 32 forming a first sidewall of the storage area 22 formed in the truck bed 1. The fourth panel is a second wing 32 forming a second sidewall of the storage area 22 formed in the truck bed 10. The first wing 32 is hinged 33 to a first side of the back-plate 24, and the second wing 32 is hinged to a second side of the back-plate 24.

Figure 8A:
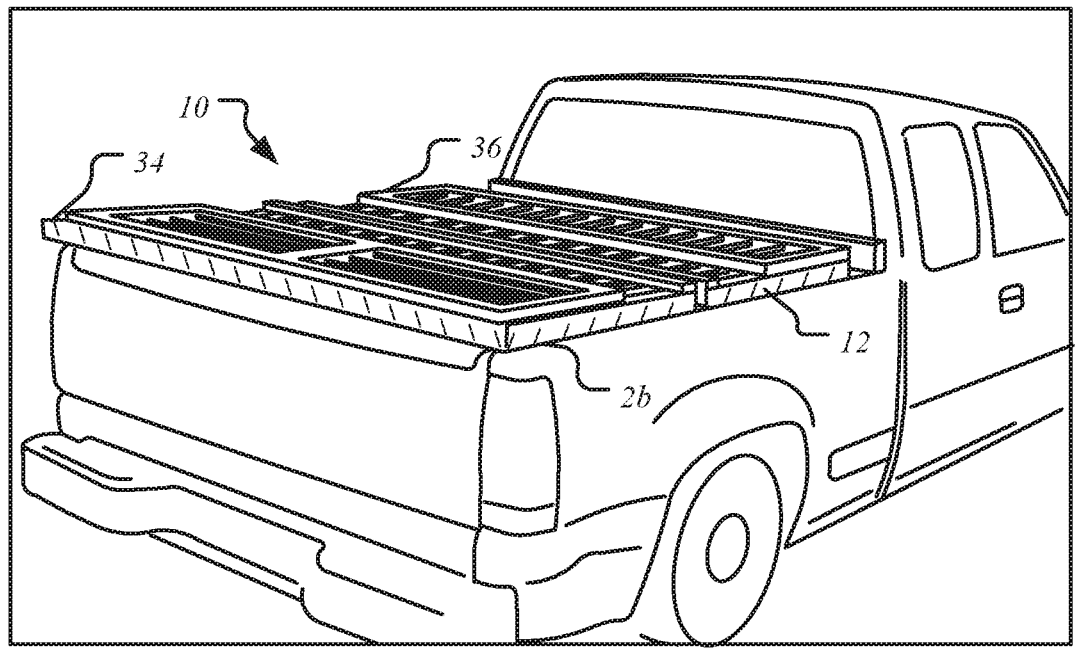
FIGS. 8A-8C show an example truck bed storage system with an extension panel.
Figure 8B:
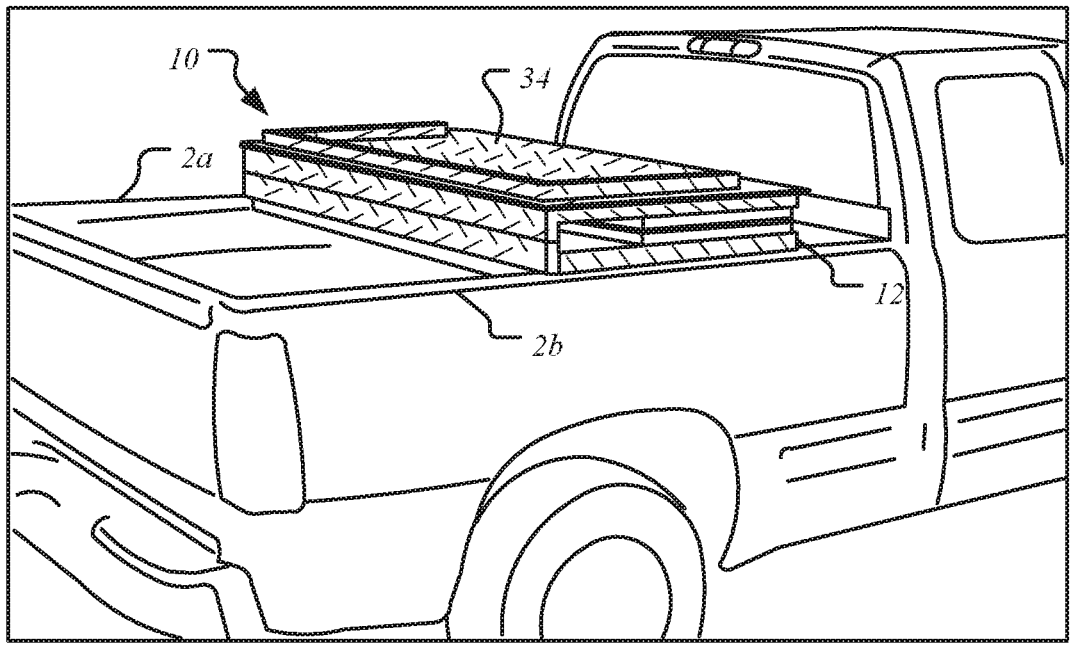
Figure 8C:
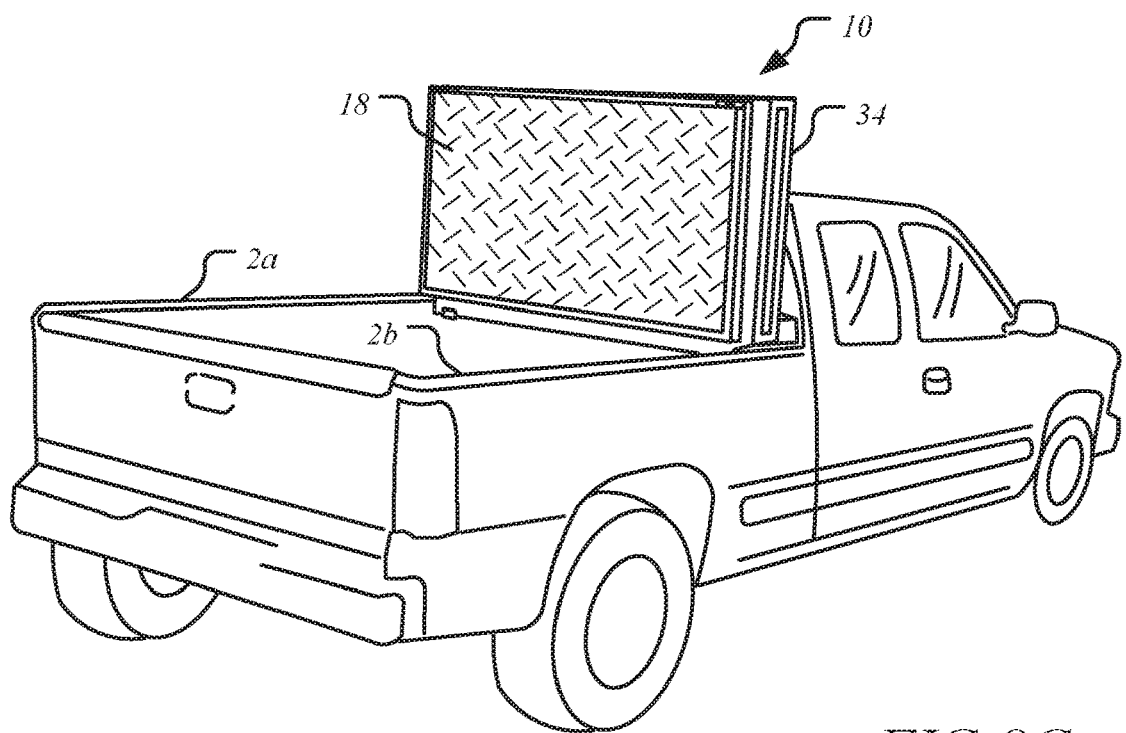

FIGS. 8A-8C show an example truck bed storage system 10 with an extension panel 34. In an example, the extension panel 34 is hinged to the frame 12. This enables the extension panel 34 to be moved from a closed position (e.g., as shown in FIG. 8A), to a partially open position (e.g., as shown in FIG. 8B), to a fully open position (e.g., as shown in FIG. 8C). The extension panel 34 may cover all or a portion of the remaining truck bed 1 behind the lid 18 of the truck bed storage system 10.

In an example, a truck owner wishing to store items in a secure manner in a truck bed may decide to use the truck bed storage system 10. By way of illustration, the dimension of the inner space may cover about a quarter of the truck bed, one-third of the truck bed, one-half of the truck bed, about two-thirds of the bed, or the entire truck bed. It is noted that lid sections may be substantially the same size, or the sections may be different sizes. The arrangement enables a user to store items inside the storage system in front of the storage system area but under the lid, extending partially outside of the lid and/or on top of the lid.

It is noted that the truck bed storage system 10 is shown in FIG. 8A for purposes of illustration including optional side rails 36, as will be described in more detail below with reference to FIGS. 10A-10B and 11A-11B. It is noted that the side rails 36 may be folded to enable opening of the extension panel 34 (e.g., as shown in FIGS. 8B and 8O).

It is also noted that the truck bed storage system 10 is configurable and reconfigurable, e.g., for different purposes and/or to haul various size loads. In an example, transformation time is less than two minutes.

In an example, a smaller box and/or toolbox may be provided by installing the mounting bracket and end plate into the position closest to the cab of the truck. The lid is folded in half and this forms the smaller box. The folded lid can be fastened down for traveling. The lid folds down to cover the entire box. To access the box, the lid folds in half, the two sides of the lid lift and stand upright against the cab of the truck.

When both lids are upright, these can be locked or fastened into position. In FIG. 8C, the lid 18 has been folded up to enable placement of large boxes in the truck bed 10. In an example, a larger box and/or cargo box may be provided by folding the end plate 24. To switch from the smaller box to a larger box, the mounting bracket and end plate move, and the lid unfolds.

Figure 9:
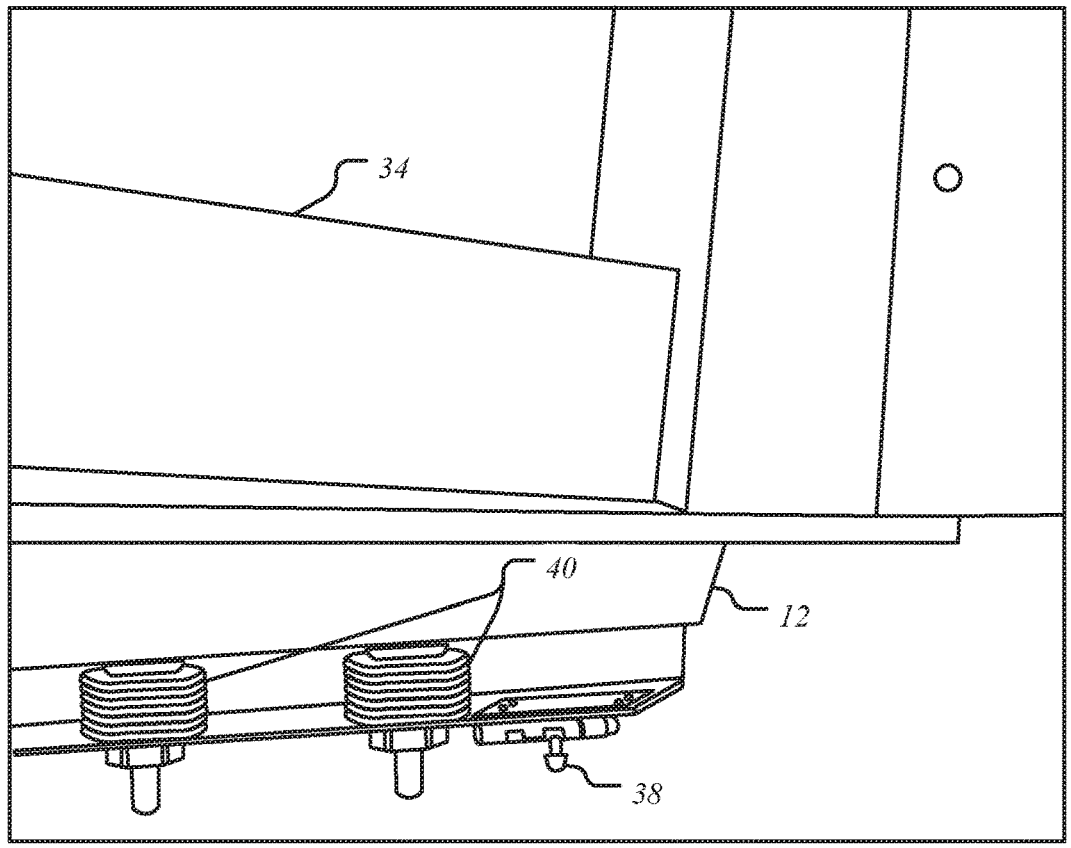
FIG. 9 is a close-up view showing a lock mechanism of the example truck bed storage system shown in FIGS. 8A-8C.

FIG. 9 is a close-up view showing a lock mechanism of the example truck bed storage system shown in FIGS. 8A-8C. In an example, the extension panel 34 may be secured to the inside lip of the truck bed 1 sidewalls 2A and 2B by a locking mechanism. The locking mechanism may include slider locks 38 operable similar to the slider locks 14a and 14b already described above.

The latches or slide locks may be mounted to the lid 18. In an example, the slider locks 38 (and/or the slider locks 14a and 14b) may be mounted to the extension panel 34 by appropriately sized spacers 40. Spacers 40 enable a snug fit so that the slider locks fit under the inner lip of the sidewalls 2A and 2B of the truck bed 1. For example, if the bed rails and various building materials are not an exact thickness or level surface, the spacers help compensate for the difference.

In an example, the latches may be extended under the inner lip of the sidewall in the truck bed to secure the frame to the truck bed. The latches secure the truck bed storage system 10 to the truck bed 1 without having to drill holes into the truck bed. As such, the truck bed storage system 10 interlocks within itself and the truck bed 1 without the drilling of holes or the use of tools.

Figure 10A:
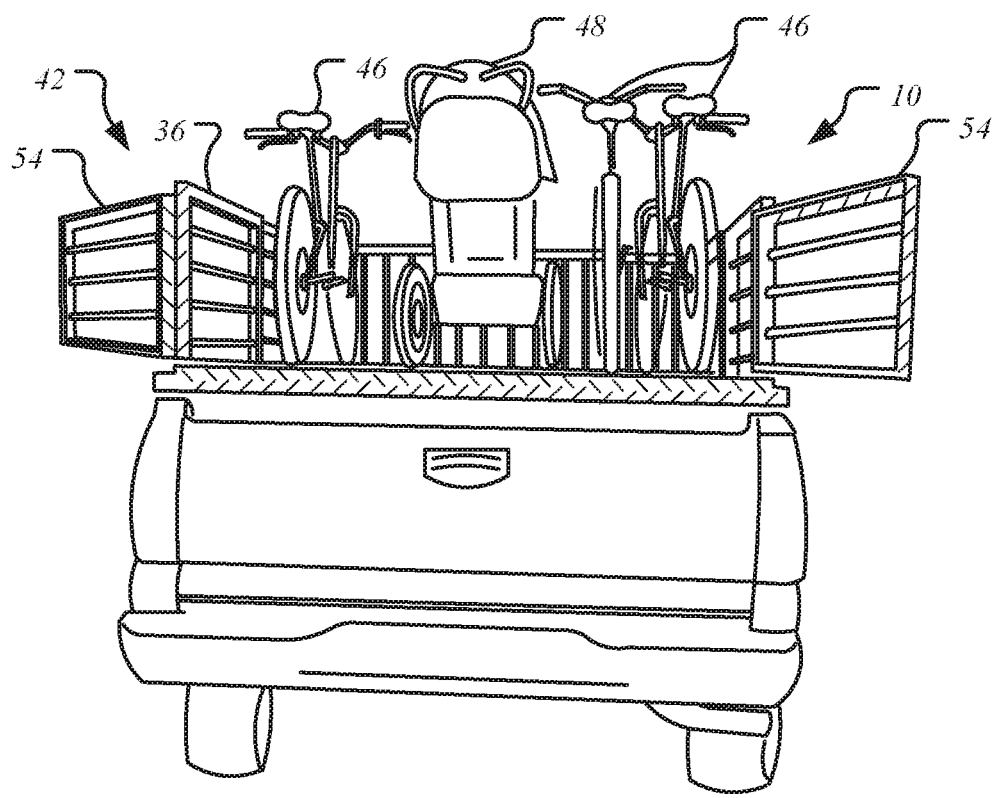
FIGS. 10A and 10B show an example truck bed storage system with an upper transport deck.
Figure 10B:
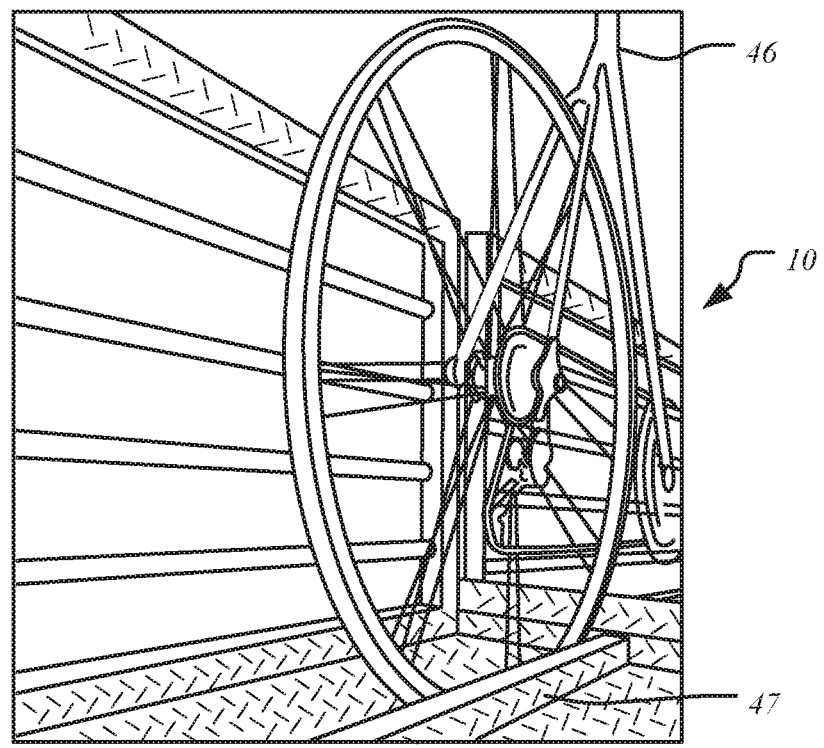
Figure 11A:
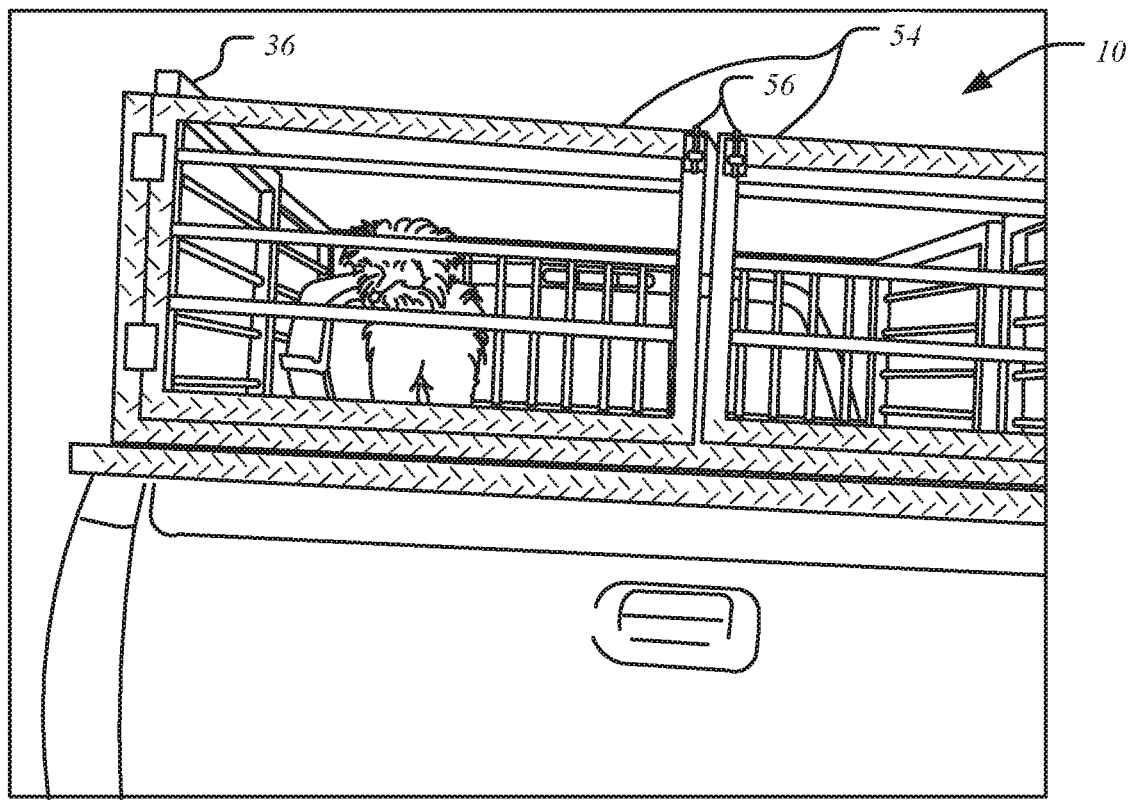
FIGS. 11A and 11B show another example truck bed storage system with an upper transport deck.
Figure 11B:
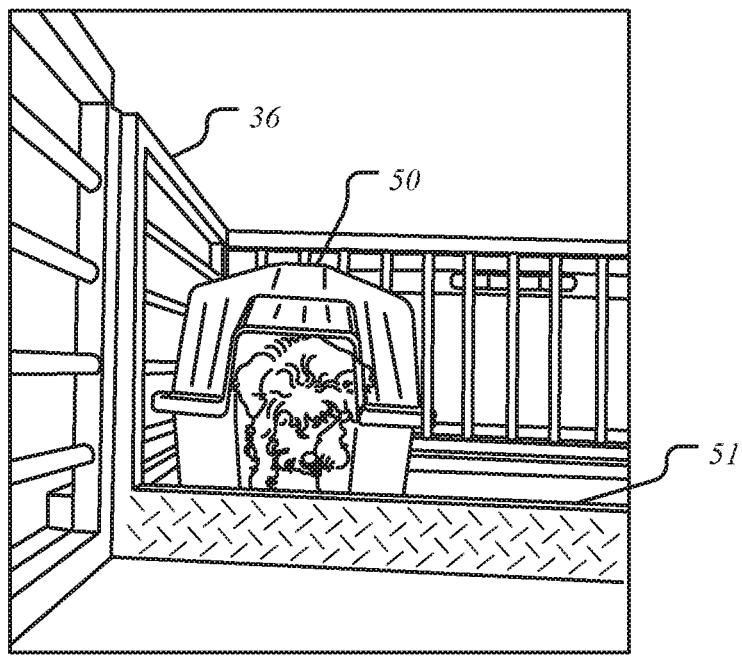

FIGS. 10A and 10B show an example truck bed storage system 10 with an upper transport deck 42. FIGS. 11A and 11B show another example truck bed storage system 10 with an upper transport deck 44. In these examples, the truck bed storage system 10 is configured to haul a load on top.

For example, in FIGS. 10A and 10B, the upper transport deck 42 is configured to carry one or more bicycle 46 and stroller 48. Of course, the upper transport deck 42 may be configured to carry other types of vehicles (e.g., canoe, wheelbarrow, etc.). The upper transport deck 42 is not limited to carrying vehicles. For example, in FIGS. 11A and 11B, the upper transport deck 44 is configured to carry a pet carrier 50 and/or a pet 52 (inside or outside of the pet carrier 50). Additional components (e.g., bike wheel guide 47 and pet slider 51) may also be provided to help maintain the position of cargo.

The side rails or fence 36 may also be provided to enable carrying of other cargo (e.g., suitcases, groceries, etc.) on the upper transport deck. Gates 54 may be provided to enable ready access through the fence 36 to the upper transport deck. The gates 54 may be locked by locks 56.

Still further examples are contemplated. The example configurations disclosed herein are provided for purposes of illustration, and are not intended to be limiting in any manner.

In an example, the truck bed storage system 10 may include one or more compartments. In an example, these compartments are referred to as a cargo box and a tool box. For example, the larger compartment is generally referred to as a cargo box, and the smaller compartment is generally referred to as a tool box. Partitions may also be provided.

It is noted that the rear panel enables the truck bed storage system to have configurable storage areas formed therein. In an example, the rear panel is positioned closer to the truck cab to provide a tool storage area. However, the rear panel and/or other partition panels (not shown) may be arranged in any desired configuration. In another example, even a single end panel may provide different size compartments in the truck bed storage system (e.g., by positioning the panel at different locations in the truck bed.

It is noted that the truck bed storage system 10 may be manufactured of any suitable material, such as but not limited to, metal (e.g., aluminum diamond plated material is shown as an example in the drawings), plastic, metal or plastic-coated wood, and/or other materials.

The storage system may be provided in any of a variety of sizes according to the size of the storage space desired and the size of the pick-up truck bed into which the system will be assembled. Any of a variety of articles may be held within an assembled truck-bed storage system, for example, tools and camping equipment.

Another example of a storage system configured as a truck on-board storage system 100 is shown in FIGS. 12-18. In an example, the truck on-board storage system is a two-sided box designed specifically for the "new truck manufacturer". The new truck bed has an indentation in the bed (the floor and/or one or more walls of the truck bed) to secure the end plate. Hinges may be provided directly on the bed rail for the lid. In addition, the new truck bed may be configured with a storage area formed between the truck bed and the cab of the truck. This box provides permanent storage on-board the new truck and is always available for service.

In an example, this two-sided box has no mounting frame. The end plate is secured by an indention in the bed. Lid hinges are mounted onto the back bed rail. The two sided box can be readily unassembled and stored between the bed and cab of the truck.

In another example, a pet enclosure may be provided. The pet enclosure may be provided as part of the storage box, as an accessory to the storage box, or as a freestanding implementation.

The pet enclosure may be provided on top of the box, or may be freestanding (albeit raised) so that the dog or other pet no longer rides down in the hot truck bed without a view of the world.

In an example, the pet enclosure may include one or more section. For example, two enclosures may be provided to make a larger enclosure, or a separated pet enclosure. In an example, the rear enclosure is hinged to raise and lower, providing access to the storage area in the truck bed underneath.

In an example, the pet enclosure may include one or more hinged side(s). The sides are hinged to lay flat for storage and shipping. The hinged configuration is easy to assemble and use.

Figure 12:
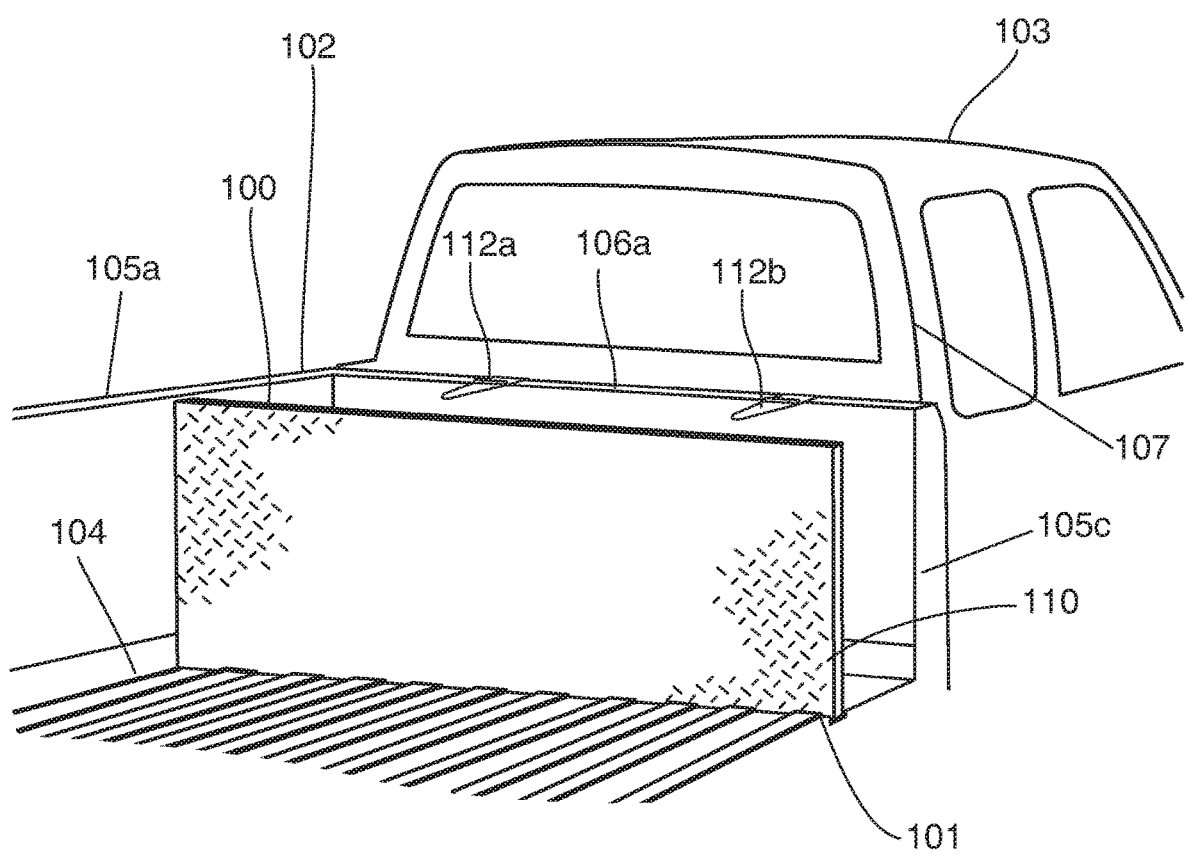
FIG. 12 is a perspective view of an example truck on-board storage system.

FIG. 12 is a perspective view of an example truck on-board storage system 100. In an example, a truck bed on-board storage system 100 includes a first panel 110 configured to slide into at least one slot 101 formed in a truck bed 102 of a truck 103. In an example, the slot 101 may be formed in the floor 104 of the truck bed 102 and/or one or more sidewall 105a-b (see, e.g., FIG. 13) of the truck bed 102.

At least one hinge 112a-b may be mounted to a bedrail 106 of the truck bed 102. Although shown mounted on the back bedrail 106 on the back wall 105c, the hinge(s) 112a-b may be mounted on any of the bedrails of the truck bed 102.

A second panel 114 (see, e.g., FIG. 13) may be connected to the at least one hinge 112a-b. The first and second panels 110 and 114 form a first enclosure such as a storage box or tool box (or simply "box") with at least three walls (e.g., 105a-c) and the floor 104 of the truck bed 102.

Figure 13:
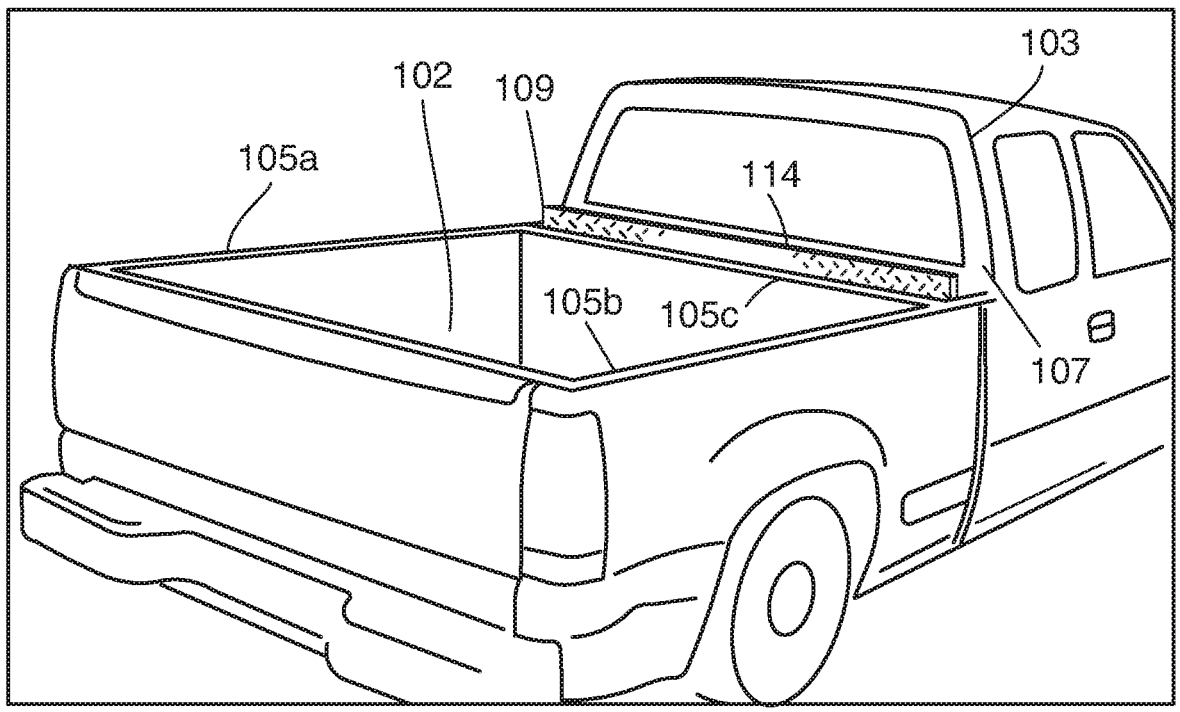
FIG. 13 is a perspective view of the example truck on-board storage system as it may be stowed between the truck bed and cab.

In an example, the first and second panels 110 and 114 are configured to be removed from the truck bed 102 and slid between a back or rear wall 105c of the truck bed 102 and a cab 107 of the truck 103. FIG. 13 is a perspective view of the example truck on-board storage system 100 as it may be stowed in a storage area 109 formed between the rear wall 105c of the truck bed and cab 107. The rear wall of the truck bed 102 may be spaced apart from the cab 107 of the truck bed 102 at a distance sized to receive both the first and second panels 110 and 114 (only panel 114 is visible in FIG. 13, but both panels can be stored here).

Figure 14:
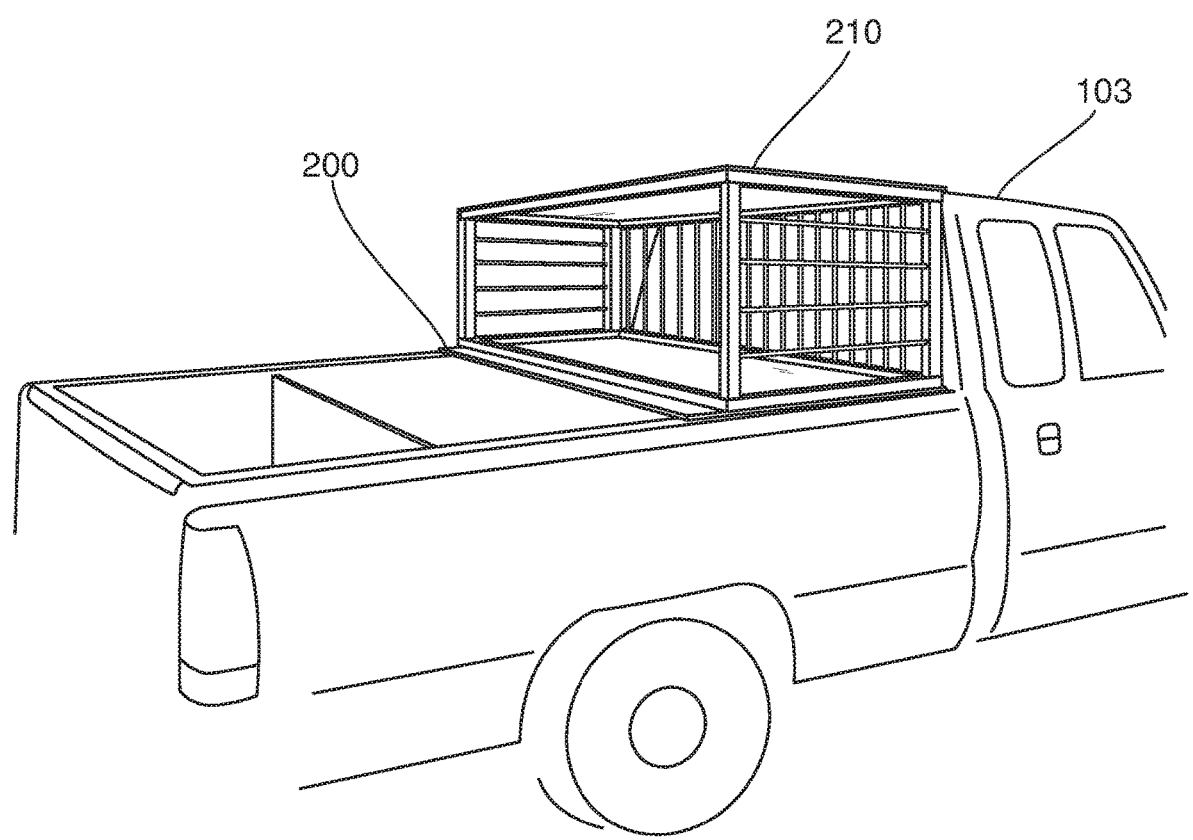
FIG. 14 is a perspective view of another example truck on-board storage system with single-section pet carrier.
Figure 18:
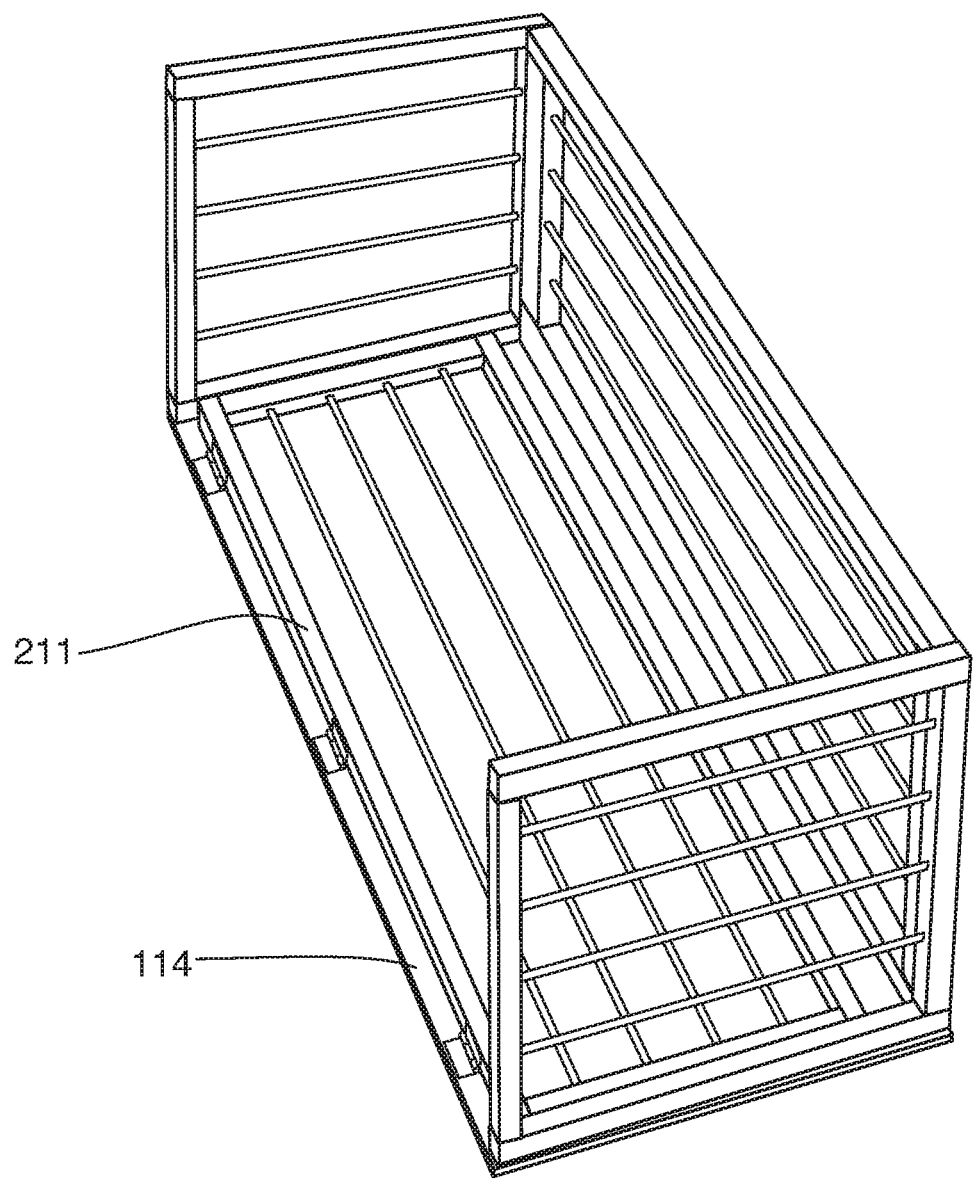
FIG. 18 is a perspective view of an example foldable wall of a pet carrier for the truck on-board storage system.

FIG. 14 is a perspective view of another example truck on-board storage system 200 with single-section pet carrier or enclosure 210. In an example, the pet enclosure 210 has at least one foldable wall connected to the second panel. FIG. 18 is a perspective view of an example foldable wall 211 of a pet carrier 210 for the truck on-board storage system, e.g., as it may be implemented with hinges.

Figure 15:
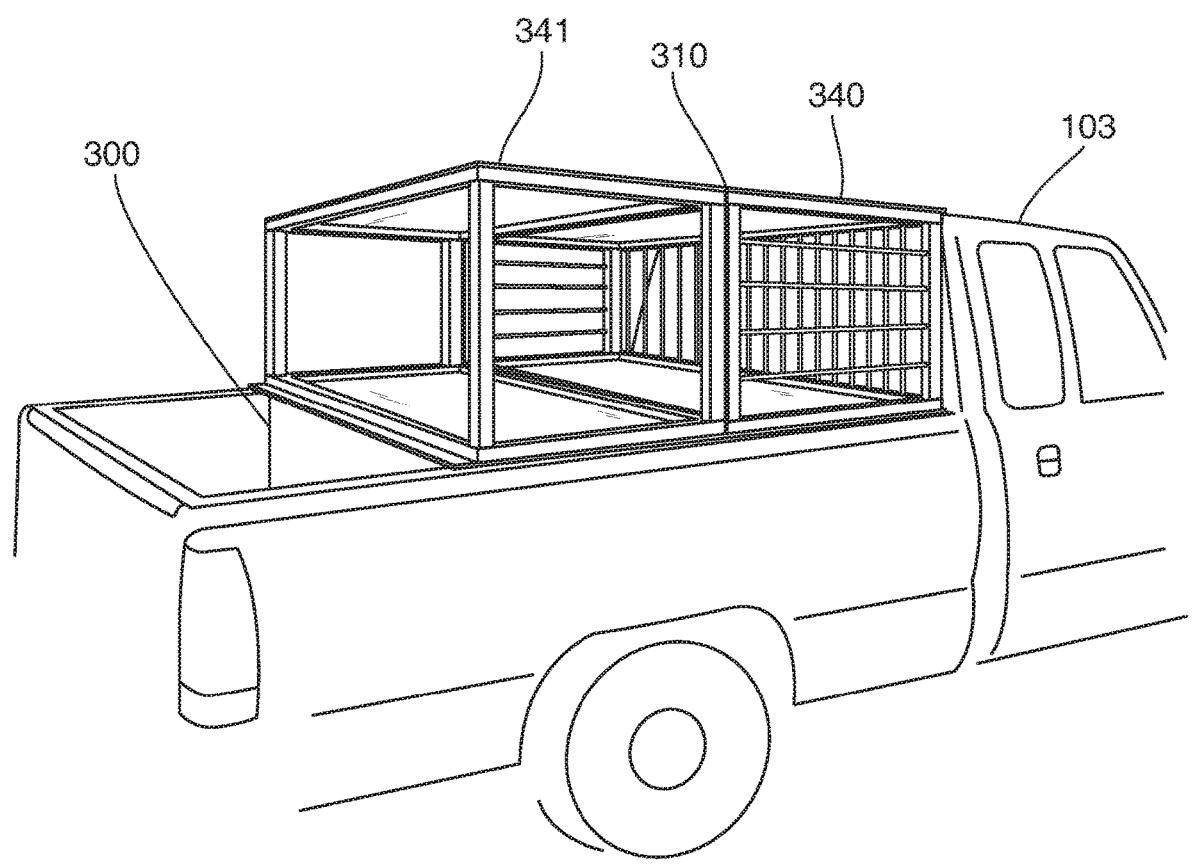
FIG. 15 is a perspective view of another example truck on-board storage system with multi-section pet carrier.
Figure 16:
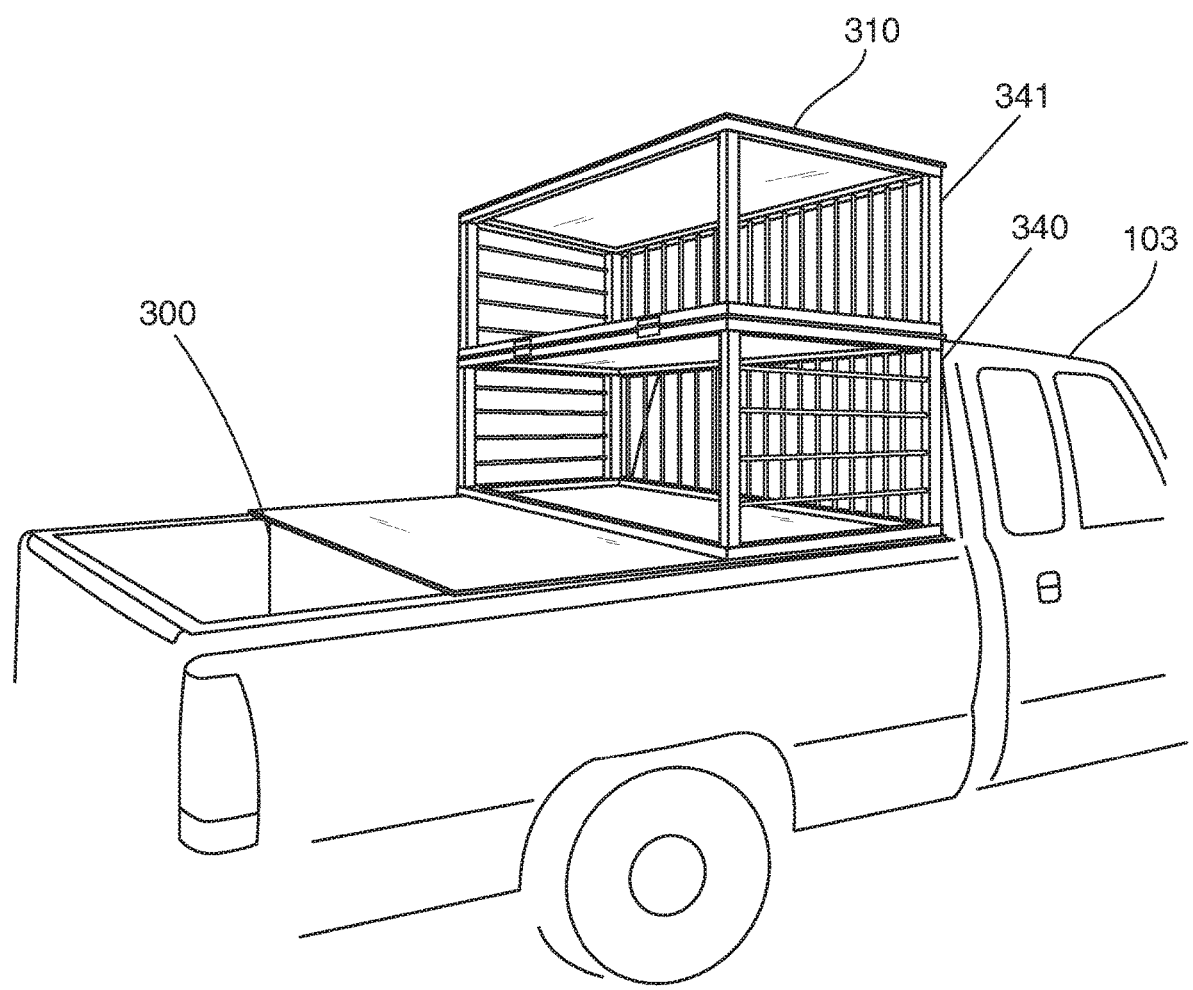
FIG. 16 is a perspective view of the example truck on-board storage system with multi-section pet carrier of FIG. 15 in a stacked configuration.
Figure 17:
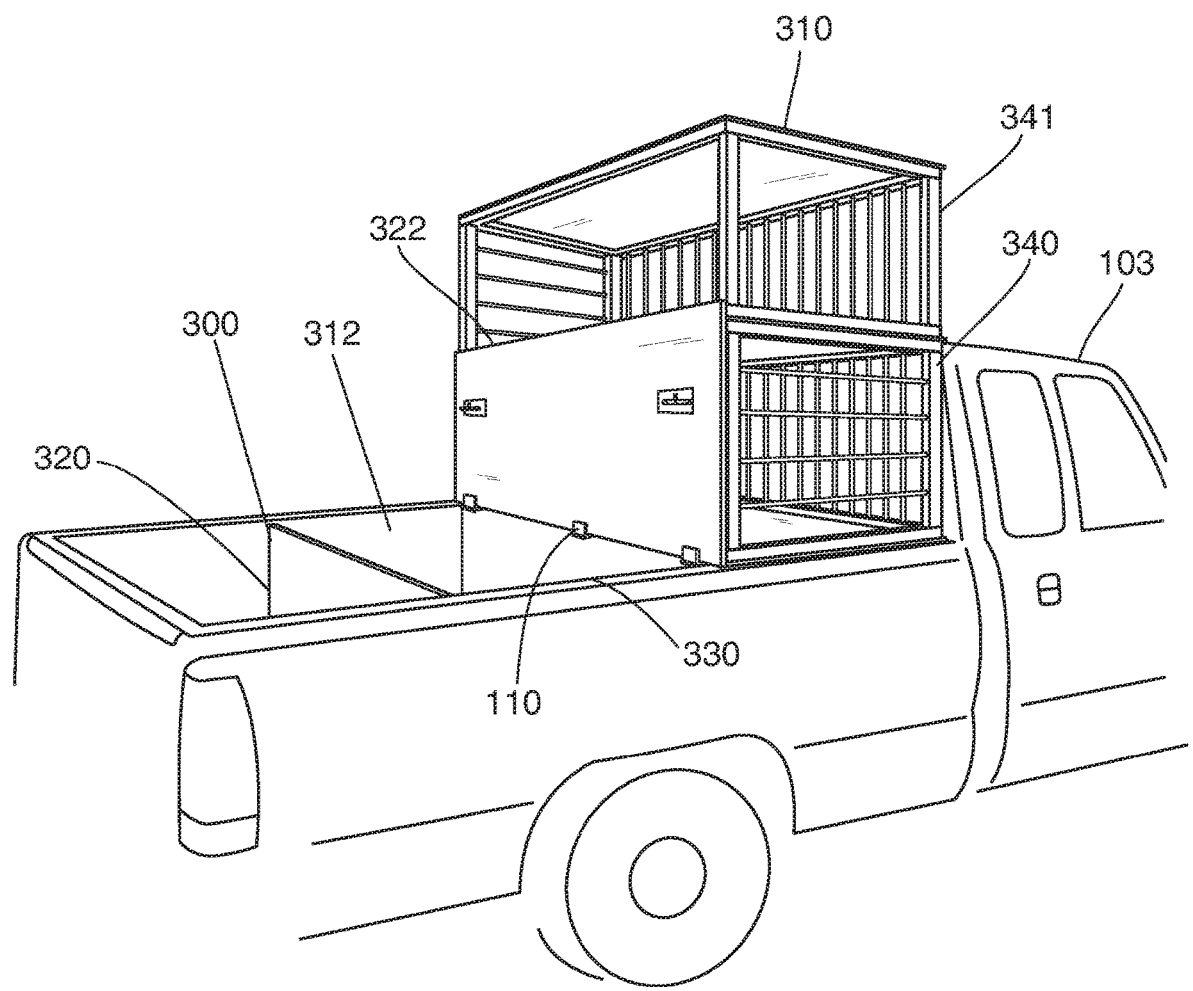
FIG. 17 is a perspective view of the example truck on-board storage system with multi-section pet carrier of FIG. 15 in a stacked configuration to access a storage compartment.

FIG. 15 is a perspective view of another example truck on-board storage system 300 with multi-section pet carrier 310. FIG. 16 is a perspective view of the example truck on-board storage system 300 with multi-section pet carrier 310 of FIG. 15 in a stacked configuration. FIG. 17 is a perspective view of the example truck on-board storage system 300 with multi-section pet carrier 310 of FIG. 15 in a stacked configuration to access a storage compartment 312.

In an example, a third panel 320 is provided to slide into at least one other slot (not shown) formed in the truck bed behind the first panel. A fourth panel 322 forms a lid. The third panel 320, the first panel 110 (from the first storage box at the front of the truck bed), and the fourth panel 322 form a second enclosure or storage box 330 with at least two walls 105a-b and the floor of the truck bed.

In an example, an extension 340 to the first pet enclosure 341, or a second pet enclosure 340, may be provided on the second storage box 330. The extension or second pet enclosure 340 is movable off of the second enclosure and onto the first pet enclosure 341 in a stacked configuration.

In an example, the extension or second pet enclosure 340 may be hingedly connected to the first pet enclosure 341 so that it can be readily moved onto the first pet enclosure 341 for access to the storage compartment 312. The fourth panel 322 can then raised to provide access to the second enclosure 312 when the extension or the second pet enclosure 340 is moved.

Figure 19:
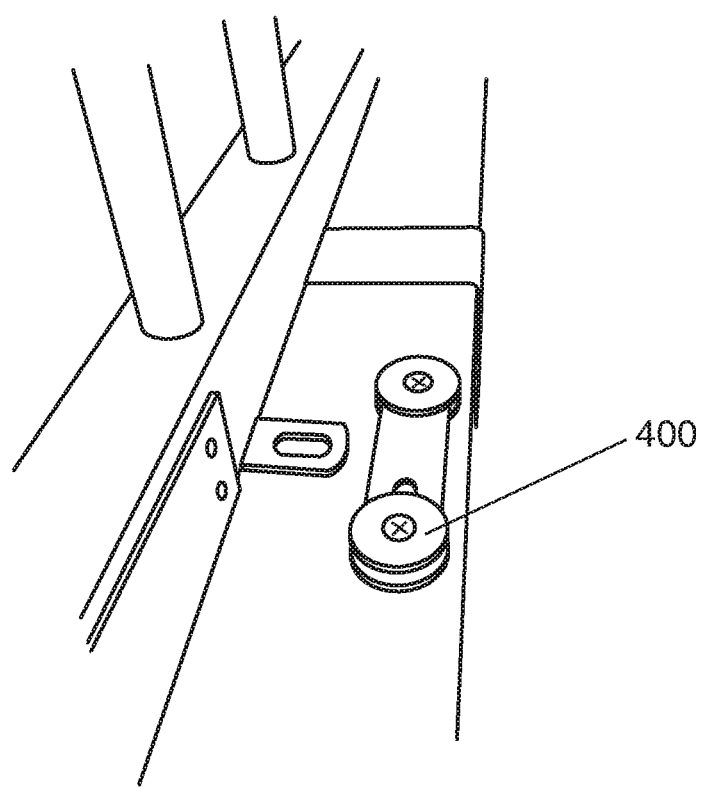
FIG. 19 shows an example quick-release as it may be implemented to connect side panel(s) and/or the pet enclosure(s).

It is noted that any number of lock and/or quick-release mechanisms may be provided. For example, the slide locks described above (e.g., also visible on panel 322 in FIG. 17) may be provided to secure the lids and/or other components of the storage box and/or pet enclosure. An example quick-release 400 is also shown in FIG. 19 for purposes of illustration, as it may be implemented to connect side panel(s) and/or the pet enclosure(s).

It is noted that the examples shown and described are provided for purposes of illustration and are not intended to be limiting. Still other examples are also contemplated.

The invention claimed is:

1. A truck bed on-board storage system, comprising:
   a first panel configured to slide into at least one slot formed in a truck bed of a truck;
   at least one hinge mounted to a bedrail of the truck bed; and
   a second panel connected to the at least one hinge, the first and second panels forming a first full enclosure with only the first and second panels and at least three walls of the truck bed and a floor of the truck bed;
   a pet enclosure having at least one foldable wall connected to the second panel;
   a third panel configured to slide into at least one other slot formed in the truck bed behind the first panel;
   a fourth panel forming a lid to a second enclosure with the third panel and the first panel and at least two walls and the floor of the truck bed; and
   an extension to the pet enclosure on the second enclosure.

2. The truck bed on-board storage system of claim 1, wherein the first and second panels are configured to be removed from the truck bed and slid between a rear wall of the truck bed and a cab of the truck.

3. The truck bed on-board storage system of claim 1, wherein a rear wall of the truck bed is spaced apart from a cab of the truck bed at a distance to receive both the first and second panels.

4. The truck bed on-board storage system of claim 1, wherein the extension to the pet enclosure has at least one foldable wall connected to the fourth panel.

5. The truck bed on-board storage system of claim 1, wherein the extension to the pet enclosure is hingedly connected to the pet enclosure.

6. The truck bed on-board storage system of claim 5, wherein the extension to the pet enclosure is movable off of the second enclosure and onto the pet enclosure in a stacked configuration.

7. The truck bed on-board storage system of claim 6, wherein the fourth panel is raised to provide access to the second enclosure when the extension to the pet enclosure is moved off of the second enclosure.

8. The truck bed on-board storage system of claim 5, further comprising at least one slide lock on the second panel and at least one slide lock on the fourth panel to secure the panels to the truck bed.

9. A truck bed on-board storage system, comprising:
- a first panel configured to slide into at least one slot formed in a truck bed of a truck;
- at least one hinge mounted to a bedrail of the truck bed;
- a second panel connected to the at least one hinge, the first and second panels forming a first enclosure with at least three walls and a floor of the truck bed;
- a rear wall of the truck bed spaced apart from the cab of the truck bed at a distance to receive both the first and second panels, wherein the first and second panels are configured to be removed from the truck bed and slid between the rear wall of the truck bed and the cab of the truck;
- a third panel and a fourth panel forming a second enclosure with the first panel and at least two walls and the floor of the truck bed;
- a pet enclosure; and
- an extension to the pet enclosure on the second enclosure.

10. The truck bed on-board storage system of claim 9, further comprising:
- a first pet enclosure on the first enclosure; and
- a second pet enclosure on the second enclosure;
- wherein the second pet enclosure is movable off of the second enclosure and onto the first pet enclosure in a stacked configuration, and wherein the fourth panel is raised to provide access to the second enclosure when the second pet enclosure is moved off of the second enclosure.

* * * * *